United States Patent [19]

Hamelin et al.

[11] Patent Number: 4,547,879
[45] Date of Patent: Oct. 15, 1985

[54] DIGITAL DATA TRANSMISSION PROCESS AND INSTALLATION

[75] Inventors: Jean-Francois Hamelin, Chatou; Michel Combe, Rueil-Malmaison, both of France

[73] Assignee: Service National Electricite de France, Paris, France

[21] Appl. No.: 548,502

[22] Filed: Nov. 3, 1983

[30] Foreign Application Priority Data

Nov. 3, 1982 [FR] France ................. 82 18425

[51] Int. Cl.[4] ............... H04J 3/00; H04J 3/02
[52] U.S. Cl. ............................... 370/86; 370/85
[58] Field of Search ............... 370/86, 85, 90, 88; 340/825.05, 825.08

[56] References Cited

U.S. PATENT DOCUMENTS

| 3,601,543 | 8/1971 | Maniere et al. | 370/86 |
| 3,786,419 | 1/1974 | Nick | 370/86 |
| 4,227,178 | 10/1980 | Gergaud et al. | 370/86 |

Primary Examiner—Douglas W. Olms
Assistant Examiner—Wellington Chin
Attorney, Agent, or Firm—Larson and Taylor

[57] ABSTRACT

The transmission of digital data takes place over a network comprising a data transmission line and a control and synchronizing line connecting together a master station, alone capable of transmitting over the control line, and several slave stations. The two lines are unidirectional and looped back to the master station and the stations transmit information in phase over the two lines. For that, each slave station comprises means for extracting clock information from the signal permanently present on the control line.

9 Claims, 4 Drawing Figures

DIGITAL DATA TRANSMISSION PROCESS AND INSTALLATION

BACKGROUND AND SUMMARY OF THE INVENTION

The invention relates to the transmission of digital data over a network comprising a data transmission line and a synchronization and control line connecting a master station alone capable of transmitting over the control line and several slave stations.

It finds an important, although not exclusive application in data acquisition systems in which the slave stations comprise a concentrator of the data coming from sensors associated with the station, as well as digitizing means if some at least of these sensors are of the analog type.

Numerous data transmission networks are already known for transmitting data, organized either in a bus line (i.e. not looped) or in a looped ring. Among the first may be mentioned the Hi Net master-slave network with bus and transmission over a twisted pair. Among the second may be mentioned the "Prime Net" token passing network, with ring topology and base band transmission over coaxial cable.

Transmission over these networks is generally asynchronous. But, because of the absence of phase relationship between the stations, each transmission of useful information must be preceded by a sync data exchange which considerably reduces the capacity of the network. In the frequent case where it is desired to reach high transfer rates, synchronous transmission is much more advantageous. But it requires having available at reception clock signals synchronized with those of the emission. A solution frequently used consists in extracting the clock signal from the digital data train received and using it for decoding: but this technique generally involves the use of phase lock loop type devices which require a synchronizing sequence preceding said message on which the latching may operate.

The length of this synchronizing sequence increases with the transmission frequency and may become considerable compared with the size of the smallest passage transmitted. Another solution consists in transmitting the clock signal used for transmitting the message over a separate channel, so as to allow immediate decoding. This technique requires the use of an additional channel to which all stations have access for transmission and reception.

A digital data transmission system is moreover known (FR-A-2,254,253) comprising both a transmission line and a control line. But there is no continuity of transmission over the control line, in a form allowing permanent extraction of the clock signal by the slave stations, and so absolute suppression of the risk of synchronization loss. More precisely, the document FR-A-2,254,253 describes a network whose "desks", i.e. the slave stations able to transmit, must be disposed in a hierarchical order in the loop (page 5, lines to 18-21) and communication with "chambers" takes place in sequence, by counting clock pulses. The sync line has only flowing therethrough clock signal bursts separated by breaks. A network is also known (US-A-3,601,543) with time slots assigned to different stations. The data signals applied to the data line are formed by modulating the sync signals received over the sync line. For that purpose, a means coupling the sync line and the data line is selectively enabled and disabled. Only successive sync frames, each preceded by a start signal, are transmitted over the sync line.

It is an object of the invention to improve upon the prior art methods of synchronous transmission of digital data over a network; it is a more specific object to ensure permanent synchronism of the clocks of all stations in a simple way.

To this end, a process according to the invention for transmitting digital data over a network comprising a data transmission line and a sync and control line connecting a master station, alone capable of transmitting over the control line, and several slave stations, includes the steps of circulating the data in phase over the two lines which have the same configuration and maintaining continuous tranmission over the control line by sending over the control line from the master station characters suitable for extraction of sync signals between the control data; at each slave station, the clock signal is continuously extracted from the information flowing over the control line.

In a preferred embodiment, the lines are unidirectional and form two parallel loops closing again on the master station.

The code used on the control line is chosen from those allowing the clock to be reconstituted from the coded message (Manchester code for example). Clock extraction is facilitated by the continuity of the transmission of characters over the control line, which may be provided by a simple device placed at the master station. Thus, there is no further need of the delay separating two successive transmissions by the master station on the control line nor of a synchronizing sequence preceding the messages transmitted over this line.

The invention also provides a data transmission installation comprising a data transmission line and a sync and control line connecting together a master station, alone capable of transmitting over the control line and several slave stations, characterized in that the two lines are unidirectional and looped back to the master station and in that the stations transmit information to phase over the two lines, each slave station comprising means for extracting clock information from the signal on the control line. Since the clock is extracted at each slave station from the information flowing over the control line, which information is in phase with the data flowing over the data line, the information flowing over the data line may be decoded, transmitted and, possibly, repeated in a very simple way; thus, the need of having any synchronizing device in the data line and any synchronizing pattern in the data transmitted is removed. Because of the monodirectional character of the two lines, under the control of a single clock, the data flows in the same direction and with the same travel times over the two transmission lines, which maintains the clocks in phase with the binary trains received.

The physical transmission medium and the method of modulation may be of any kind, provided that they are compatible with the pass-band required. If the medium is non diffusing, there may be physical continuity of the transmission medium from the transmission access of the master station to the reception access of this same station, over the two transmission lines. If, on the other hand, the physical transmission medium forming the data line is diffusing, it must be interrupted at each station and each slave station plays the role, among others, of repeater for the information transiting over the data line.

The invention will be better understood from the following description of particular embodiments of the invention, given by way of non limiting examples.

SHORT DESCRIPTION OF THE DRAWINGS

DETAILED DESCRIPTION OF PREFERRED EMBODIMENTS

Figure 1:
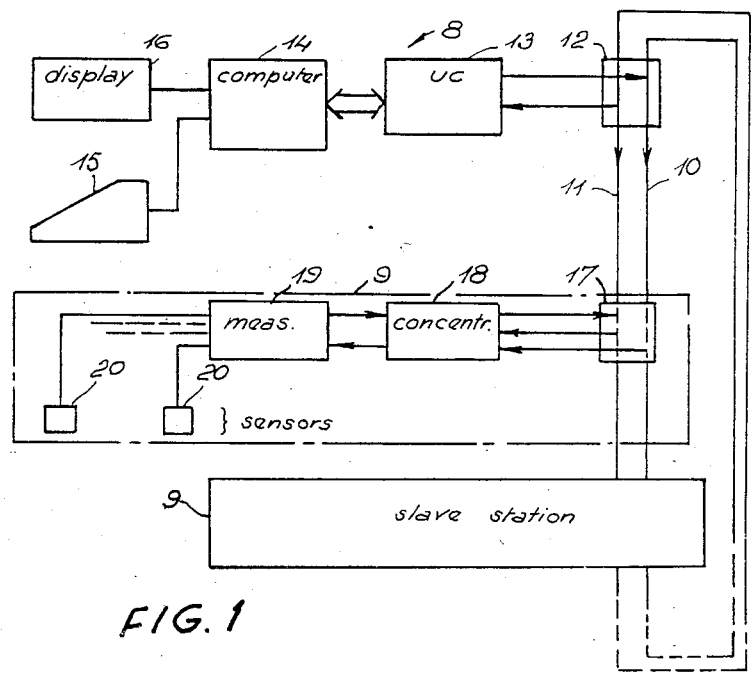
FIG. 1 is a simplified diagram of a measurement data acquisition decantralized system incorporating the invention.

The acquisition system shown in FIG. 1 comprises a master station 8 and several slave stations 9 connected together by a control line 10 and a data line (or response line) 11, both monodirectional and closed back on the master station. The master station 8 may be regarded as comprising an interface coupler 12 between the lines, on the one hand, and an assembly formed by a control unit UC 13, a computer 14 and input-output means on the other. In FIG. 1, the input-output means are schematized in the form of an operator console 15 and a recording and/or display apparatus 16, other units being obviously possibly provided.

Each of the slave stations 9 may, as far as it is concerned, be regarded as comprising a coupler 17, a concentrator 18 and a measurement unit 19 associated with analog and/or digital sensors 20. Elements 18,19 and 20 may be of conventional construction.

The concentrator 18 provides the usual functions of processing the communications with its measurement unit 19, shaping the data coming from the measurement unit, storing the data in buffer memories, transmission control etc.

Coupler 17 will have a different construction depending on whether the transmission media are diffusing or non diffusing.

In the first case, which is for example that of a coaxial cable or a twisted pair, the physical transmission medium must be interrupted at each coupler so as to ensure the monodirectional character of the transmission. Coupler 17 shown schematically in FIG. 2, which fulfils this condition, comprises a circuit XH22 for extracting the clock signal which receives the data coming continuously from the master station 8 over the control line 10. This circuit 22 is, for example, a differentiating circuit driving a phase lock loop if the information travelling over line 10 is coded in Manchester code. A decoder 23 driven by the control line 10 is controlled by the clock signal supplied by the circuit XH22. Decoder 23 feeds to the concentrator 18, over line 29, the decoded information travelling over line 10, namely the controls emitted by the master station 8 separated by a succession of identical characters or character chains emitted continuously so as to facilitate elaboration of the sync signals (local clocks) by the circuits XH22 of the different slave stations. Circuit XH22 also drives the decoder 27 which receives, then delivers to the concentrator 18, over line 28a, the data outputted by the other slave stations 9 of the system over line 11.

It can be seen that no clock extraction or other form of synchronization is effected on the data line 11, the data received over this line 11 being, because of the very principle of the invention, in phase with the clock signals elaborated by the circuit XH22.

An encoder 24 receives the decoded signals received from decoder 23, recodes them and re-transmits them over line 10 to the next slave station. Coder 28 fulfils the same function for the information arriving over line 11. When its input is connected by a switch 25 to the output of decoder 27.

Switch 25 comprises an input which receives the decoded information flowing in line 11, supplied by decoder 27, and an input which receives the local information coming over 30 from the concentrator 18. In a stand-by situation, switch 25 lets the information flowing over line 11 pass towards the coder 28, so that coupler 17 is then transparent to the data signals. When switch 25 on the contrary receives, at a control input 26, a signal indicating that the corresponding slave station is authorized to transmit, and when this station has a message to transmit, switch 25 lets through the information coming from the concentrator 18 over line 30. The slave station may then transmit over the data line 11 to the master station.

Since the two encoders 24 and 28 are driven by the same clock 22, the re-transmitted data are perfectly in phase. So that this re-transmitted data also arrive in phase at the next station of the network, the difference between the times of travel of the signals over the two lines up to this next station must be less than a fraction, typically less than one fourth, of the duration of the shortest of the stable states of an information bit. After decoding, this requirement is easily complied with for distances of a few hundred meters and a flowrate reaching 10 Mbits/s, if lines 10 and 11 are two of the lines of a common multiline cable. The maximum difference in length to be complied with is of about 2 m.

Since the clock signal from circuit XH22 is also supplied to the concentrator 18, the operation of this latter may be synchronized with that of the other stations of the network. In fact, signals at a multiple or sub-multiple frequency may be readily produced from the clock signal supplied and may be used directly by concentrators 18.

Some of the components of the coder which has just been described could be considered as belonging to concentrator 18.

Figure 2:
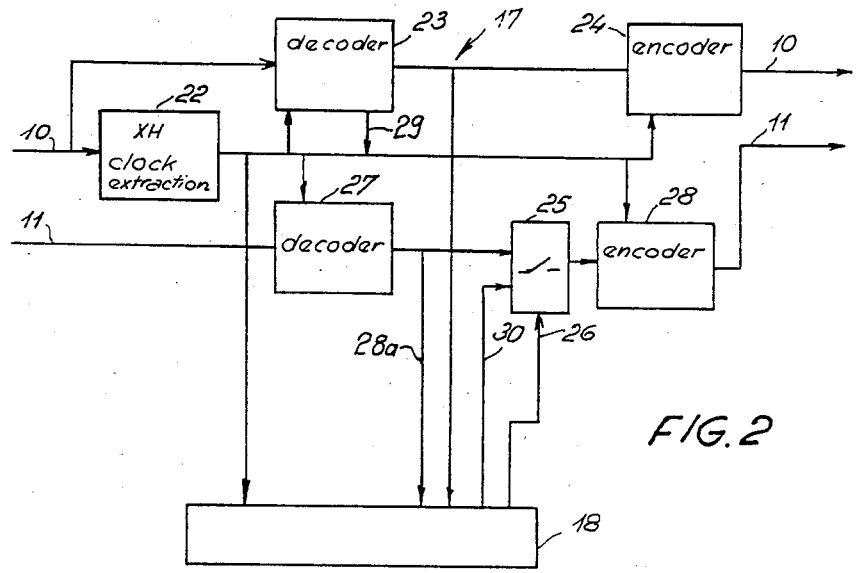
FIGS. 2 and 3 are block diagrams showing possible embodiments of the synchronizing means usable in the slave stations of the system of FIG. 1.

It can be seen that, in the case shown in FIG. 2, each slave station 9 plays the role of repeater. On the two lines 10 and 11, the information all be decoded, then coded again under the control of the local clock 22 and thus re-shaped. This repeater configuration is necessary if the transmission medium is diffusing, so that the information is propagated in a single direction over line 11, which may receive information from several stations. On line 10, the information is naturally propagated in a single direction from the master station 8 and it is sufficient to prevent it from passing again through coupler 12 after having travelled round the loop.

Figure 3:
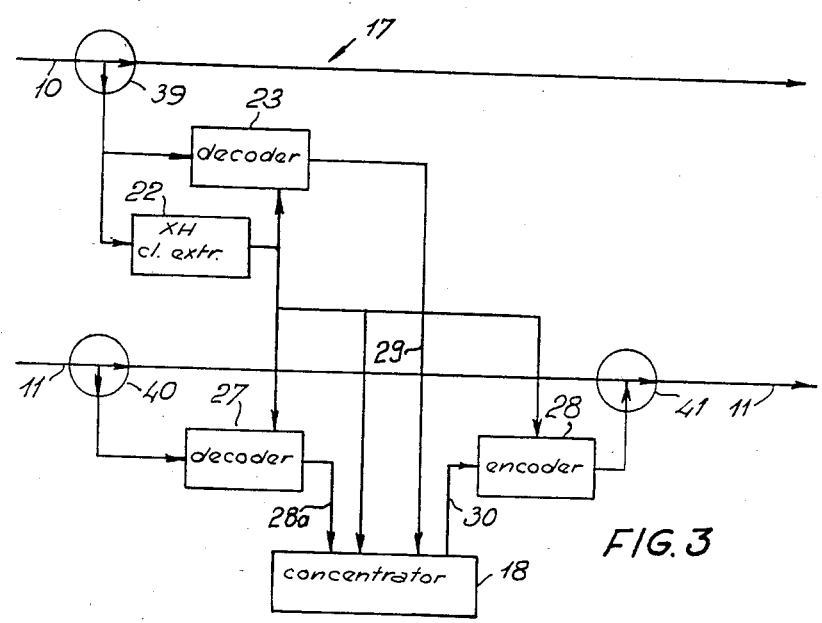

In the case where a non diffusing transmission medium is used for forming line 11, coupler 17 may be simplified and have the simplified construction shown in FIG. 3. In this figure, two passive couplers 39 and 40 placed respectively in lines 10 and 11 allow a small fraction of the energy which flows therein to be derived. To the extent that they let through the greatest part of the energy, it is not necessary to provide for re-transmission, by active components, of the decoded data. The lines are then not interrupted. The synchronizing principle remains identical to the one already described with reference to FIG. 2. The data travelling over the two lines is decoded in respective decoders 23 and 27 from the signals supplied by a circuit XH22. A coder 28, driven by the clock signal coming from circuit 22 transmits, over line 11, the data which coupler 18 presents thereto over line 30. This data is inserted in line 11 by the directional coupler 41 which may be combined with coupler 40.

Again, the synchronism of all the data travelling over lines 10 and 11 is well ensured. However, in the configuration of FIG. 3, the requirement concerning the difference between the transit times over the two lines 10 and 11 is more strict, since the difference in time must be calculated for a path over the whole of the loop and not between two successive stations.

The construction shown schematically in FIG. 3 may more especially be used when the medium is formed by a dielectric optical wave-guide and more especially by an optical fiber. Light transmission over a fiber is in fact monodirectional. However, the present technology of deriving light from an optical fiber does not allow a high number (greater than about 30) of couplers to be used without adapting the optical receivers associated with each station. When the system is to comprise a large number of stations, couplers may then be used of the kind shown in FIG. 1.

Figure 4:
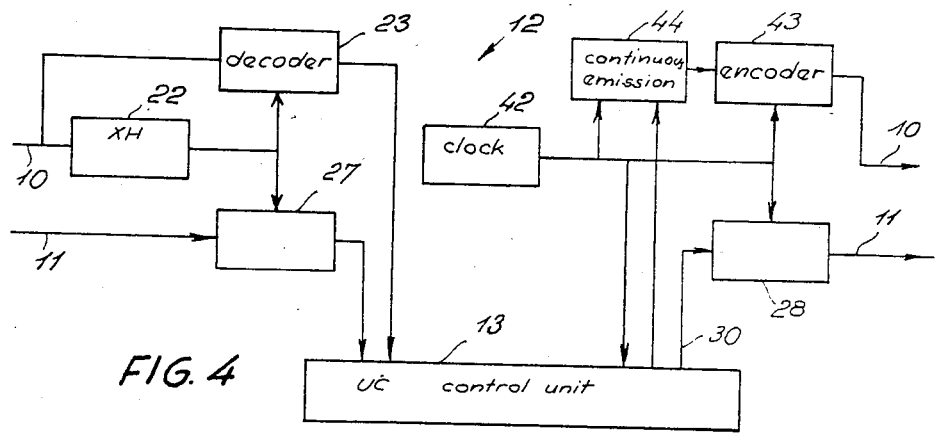
FIG. 4 is a simplified block diagram showing synchronizing means usable to the master station of the system of FIG. 1.

An example of the principle of construction of coupler 12 of the master station 8 is given in FIG. 4. This coupler comprises a reception part which may be identical with that of coupler 17. This part will then not be described and its components are designated, in FIG. 4, by the same reference numbers as in FIGS. 2 and 3.

The emission part comprises a master clock 42 which is transmitted over line 10 to the slave stations 9 through a decoder 43. The clock signal is transmitted directly outside the interrogation periods of a slave station, by a continuous transmission circuit 44 driving the coder 43. During the interrogations transmitted by the master station, the clock signal synchronizes the emission coders 43 and 28. It can be seen that, even in the absence of information to be transmitted by the master station, line 10 is active and no loss of synchronization is possible in the slave stations 9. Clock 42 may be of high stability and thus minimize the absolute drift of all the clocks of the system. Circuit 44 may be provided so as to transmit always the same bit during idle periods; the beginning of the useful information may then be formed consistently by the complementary bit.

The control unit 13 of the master station will not be described here for it may be conventional. Unit 13 forms a small frontal computer inserted between the transmission network and the computer 14. It fulfils several tasks:

it assigns the use of the data line 11 to a concentrator, by resolving possible access conflicts and verifies that the storage capacities of the memories of the concentrator 18 are not exceeded, it controls the correct working of the system, it puts into shape the data received over the network to make it acceptable by the computer: this data circulates for example over line 11 in frames and must be put into parallel form.

The procedure to acces to the network may be the following: the control unit 13 interrogates successively the different slave stations 9 according to a sequence which may depend on the expected volume of data and also on the last or slow character of the concentrators. In response, each concentrator requests or not authorization to transmit, depending on the degree of congestion of its local memory and on predetermined criteria, for example the accepted delay on transmission of the information. In general, the concentrator will group together the data to be transmitted, will structure it into arrays in the local memory and will provide appropriate formatting, for example in accordance with the high level standardized pattern HDLC which is much more economic than transmission by words.

When, in response to an interrogation signal, a particular slave station sends a signal indicating that information is to be transmitted over line 11, the control unit 13 sends authorization to transmit and the appropriate concentrator 18 transmits by arrays. Then the sequence continues. Such a method of dynamic assignment of line 11 presents the advantage of great flexibility as to the structure of the installation, to which may be readily added extra slave stations.

The invention consequently allows a high flow installation to be constructed in a simple way and it may be mentioned by way of example that the following performances have been attained, with optical fiber transmission:

Overall capacity: 10 Mbits/s
Accuracy of synchronization: ±100 ns.

We claim:

1. A process for synchronous transmission of digital data over a network connecting a master station and a plurality of slave stations and comprising a data transmission line and a control and synchronizing line having the same configuration, said process comprising the steps of: transmitting control information suitable for extraction of a clock signal from the master station over the control line and sending characters suitable for extraction of a clock signal throughout the time separating messages of said control information, whereby there is continuous transmission from the master station over said control line; continuously extracting said clock signal from the information circulating over said control line at each slave station; and transmitting data over said data transmission line from one of said slave stations at a time, said one station being identified by said control information.

2. A process according to claim 1 wherein a same bit is repetitively transmitted from the master station over the control line during idle periods and indicating the beginning of interrogations by the master station by transmitting the complementary bit.

3. A process according to claim 1, wherein the code used for transmission over the control line from the master station is selected from those allowing a clock signal to be reconstituted from coded messages.

4. An installation for transmitting digital data over a network comprising: a data transmission line and a control and synchronizing line, said lines being unidirectional, having substantially the same transmit time and being looped; a master station connected to said lines and capable of transmitting over the control line; a plurality of slave stations connected to said lines capable of receiving over said lines and of transmitting over said control line; said master station being arranged for transmitting, over the control line, control information separated by repeated sync characters whereby transmission from said master station is continuous, while each of said slave stations comprises means for extracting clock information from the continuous signal on the control line and transmitting information in phase with the clock signal over said data transmission line.

5. An installation according to claim 4, wherein the data transmission line at least is formed by physical support medium which is interrupted at each station.

6. An installation according to claim 4, wherein the data transmission line at least is non diffusing and the slave stations are connected to the data transmission line by passive couplers.

7. An installation according to claim 4, wherein each of said slave stations comprises a clock extraction circuit connected to the control line and continuously supplying a synchronizing signal to a concentrator for processing data to be transmitted, a decoder for directing the concentrator instructions from the master station and intended for that slave station and decoder and encoder means coupled with the data transmission line, synchronized by the signal from the clock extraction circuit.

8. Installation according to claim 4, wherein the difference in transit time of the information over said lines between two statins where they are regenerated in less than one fourth of the duration of the shortest of the stable states of an information bit after encoding.

9. An installation for transmitting digital data over a network comprising: a data transmission line and a non-diffusing control and synchronizing line, said lines being unidirectional and having substantially the same transit time; a master station connected to said lines and capable of transmitting over the control line; a plurality of slave stations connected to said lines, capable of receiving from said lines through passive couplers and of transmitting and receiving over said transmission line; said master station being arranged for transmitting, over the control line, control information of a type suitable for sync extraction separated by sync signal characters whereby transmission from said master station is continuous, while each of said slave stations comprises means for extracting clock information from the continuous signal over the control line for synchronous encoding and decoding of information circulating over said data transmission line.

* * * * *